(12) United States Patent
Zhang et al.

(10) Patent No.: US 7,735,010 B2
(45) Date of Patent: Jun. 8, 2010

(54) CITATION NETWORK VIEWER AND METHOD

(75) Inventors: Paul Zhang, Centerville, OH (US); Lavanya Koppaka, Miamisburg, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 801 days.

(21) Appl. No.: 11/397,683

(22) Filed: Apr. 5, 2006

(65) Prior Publication Data

US 2007/0239706 A1    Oct. 11, 2007

(51) Int. Cl.
G06F 3/00 (2006.01)
(52) U.S. Cl. .................. 715/713; 715/700; 715/712
(58) Field of Classification Search .......... 715/700, 715/712, 713; 707/2, 1, 100
See application file for complete search history.

(56) References Cited

U.S. PATENT DOCUMENTS

| | | | |
|---|---|---|---|
| 4,752,889 A | 6/1988 | Rappaport et al. | |
| 5,546,529 A | 8/1996 | Bowers et al. | |
| 5,794,236 A | 8/1998 | Mehrle | |
| 5,819,260 A | 10/1998 | Lu et al. | |
| 5,918,236 A * | 6/1999 | Wical | 715/209 |
| 5,926,811 A | 7/1999 | Miller et al. | |
| 6,263,351 B1 * | 7/2001 | Wolfe | 715/236 |
| 6,289,342 B1 * | 9/2001 | Lawrence et al. | 707/7 |
| 6,297,824 B1 | 10/2001 | Hearst et al. | |
| 6,389,436 B1 * | 5/2002 | Chakrabarti et al. | 715/229 |
| 6,499,026 B1 * | 12/2002 | Rivette et al. | 707/2 |
| 6,502,081 B1 | 12/2002 | Wiltshire, Jr. et al. | |
| 6,628,313 B1 * | 9/2003 | Minakuchi et al. | 715/853 |
| 6,647,534 B1 * | 11/2003 | Graham | 715/205 |
| 6,684,202 B1 | 1/2004 | Humphrey et al. | |
| 6,772,149 B1 * | 8/2004 | Morelock et al. | 707/6 |
| 6,819,344 B2 * | 11/2004 | Robbins | 715/848 |
| 6,856,313 B2 * | 2/2005 | Gossweiler et al. | 345/419 |
| 6,856,988 B1 | 2/2005 | Humphrey et al. | |
| 6,918,097 B2 | 7/2005 | Parisi | |
| 6,925,608 B1 * | 8/2005 | Neale et al. | 715/763 |
| 6,931,604 B2 | 8/2005 | Lane | |
| 6,985,908 B2 * | 1/2006 | Nakano | 707/102 |
| 7,028,050 B1 * | 4/2006 | Rose | 707/104.1 |
| 7,028,259 B1 * | 4/2006 | Jacobson | 715/236 |
| 7,043,489 B1 * | 5/2006 | Kelley | 707/101 |
| 7,062,498 B2 * | 6/2006 | Al-Kofahi et al. | 707/101 |
| 7,065,514 B2 * | 6/2006 | Yang-Stephens et al. | 707/2 |
| 7,085,755 B2 * | 8/2006 | Bluhm et al. | 707/3 |
| 7,134,095 B1 * | 11/2006 | Smith et al. | 715/860 |
| 7,188,117 B2 * | 3/2007 | Farahat et al. | 707/101 |

(Continued)

OTHER PUBLICATIONS

S. Sen et al., "LawBot: A Multiagent Assistant for Legal Research", IEEE Internet Computing, vol. 4, No. 6, Nov. Dec. 2000, p. 32 37.

(Continued)

Primary Examiner—Simon Ke
(74) Attorney, Agent, or Firm—Jacobson Holman PLLC

(57) ABSTRACT

A visualization-based interactive legal research tool that generates from a multi-dimensional citation network a semantics-constrained citation sub-network that focuses on one individual issue in which a user is interested, and puts the sub-network on an interactive user interface ("UI"), which allows the researcher to browse, navigate, and jump over to start new sub-networks on different issues that are relevant to original issues.

8 Claims, 8 Drawing Sheets

U.S. PATENT DOCUMENTS

| | | | | |
|---|---|---|---|---|
| 7,197,697 | B1* | 3/2007 | Tsukamoto | 715/234 |
| 7,383,513 | B2* | 6/2008 | Goldberg et al. | 715/763 |
| 2001/0027452 | A1* | 10/2001 | Tropper | 707/3 |
| 2004/0080549 | A1 | 4/2004 | Lord et al. | |
| 2005/0278633 | A1* | 12/2005 | Kemp | 715/713 |
| 2006/0075326 | A1* | 4/2006 | Patel et al. | 715/501.1 |
| 2006/0242564 | A1* | 10/2006 | Egger et al. | 715/513 |

OTHER PUBLICATIONS

S. Sutton, "The Role of Attorney Mental Models of Law in Case Relevance Determinations: An Exploratory Analysis," Journal of the American Society for Information Science, 45(3): 186-200) (1994).

Al-Kofahi et al., "A Machine Learning Approach to Prior Case Retrieval," ICAIL-2000.

Rissland et al., "BankXX: Supporting Legal Arguments through Heuristic Retrieval," Artificial Intelligence and Law, 1996(4): 1-71).

M. J. Bates, "Where Should the Person Stop and the Information Search Interface Start?," Information Processing & Management, 26:575-591 (1989).

S. M. Marx, "Citation Networks in the Law," Jurimetrics Journal, 1970:121-137.

K. Ashley et al., "An Introduction to Artificial Intelligence and Law," Tutorial Handout of Introduction to AI and Law at ICAIL (2005).

Hooge et al., "Semantics in the Legal Domain," http://www.arches.uga.edu/~jhassell/project/legal_paper.pdf (2004).

Schild et al., "A Taxonomy for Modeling Discretionary Decision Making in the Legal Domain," Proceedings of the Tenth International Conference on Artificial Intelligence and Law (2005).

Winkels et al., "Constructing a Semantic Network for Legal Content," Proceedings of the Tenth International Conference on Artificial Intelligence and Law (2005).

Lame et al., "Updating Ontologies in the Legal Domain," Proceedings of the Tenth International Conference on Artificial Intelligence and Law (2005).

Bourcier et al., "Methodological Perspectives for Legal Ontologies Building: an Interdisciplinary Experience," Proceedings of the Tenth International Conference on Artificial Intelligence and Law (2005).

Walter et al., "Computational Linguistic Support for Legal Ontology Construction," Proceedings of the Tenth International Conference on Artificial Intelligence and Law (2005).

Smith, "The Web of Law," San Diego Legal Studies Research Paper No. 06-11, http//ssrn.com/abstract=642863 (2005).

* cited by examiner

CITATION NETWORK VIEWER AND METHOD

CROSS-REFERENCE TO RELATED APPLICATIONS

Not applicable.

COPYRIGHTED MATERIAL

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to interactive research tools. More specifically, the invention relates to a visualization-based interactive research tool that allows researchers to study individual legal issues of interest.

2. Related Art

The U.S. and some other countries follow a common law system, in which laws developed over centuries and were largely derived from judicial opinions. The legal systems in these countries are based on the doctrines implicit in court decisions, customs, and usages, rather than on codified written rules. Common laws rely heavily on the concept of precedence—on how the courts have interpreted the law in individual cases (hence, the term case law). This reliance by the legal system on precedent makes it critical for legal practitioners to study case citations—how issues related to his or her current case were discussed and ruled on in previous cases.

When an attorney starts research with a legal problem in mind, he or she goes through a repetitive mental process of forward and backward searching in the imaginary space of legal issues embodied mainly by previous cases. This kind of mental model, by way of which the attorney's cognitive map of a legal doctrine in question is built, is discussed by Sutton (Stuart A. Sutton, "The Role of Attorney Mental Models of Law in Case Relevance Determinations: An Exploratory Analysis," *Journal of the American Society for Information Science*, 45(3): 186-200) (1994)). In this type of research, as described by Sutton, the attorney employs one or more seed cases to engage in a practice that is variously referred to as "gathering citations" (S. K. Stoan, "Research and Library Skills: An Analysis and Interpretation," *College & Research Libraries*, 45:99-109 (1984)), "chaining" (D. Ellis, "A Behavioral Approach to Information Retrieval System Design," *Journal of Documentation*, 45: 171-212. (1989)), and "footnote chasing" and "citation searching" (M. J. Bates, "Where Should the Person Stop and the Information Search Interface Start?," *Information Processing & Management*, 26:575-591 (1989)). FIG. 5 (which is taken from Sutton) depicts part of this process as a general attorney behavior model. In the center of FIG. 5 is the seed or root case of interest 50. The arrows represent the direction of the searcher's chaining, and the passage of time is represented by the position of each case, i.e. from left to right. From the Known Seed Case 15 (in the center), the attorney first finds Case 18 and Case 19 through Shepardizing (a term that means finding cases that cited a given case in the legal corpus). He then finds Cases 11 and 12 by Internal Tracking, which involves reading the document and searching for more citations. Here the search is bi-directional: forward chaining to find cases that cited the current case, and backward chaining to find cases that the current case cited to. The whole process is recursive; at each step the researcher finds one or more cases. Each of these new cases is then used to trace and find more cases in the same manner. Marx (Stephen M. Marx, "Citation Networks in the Law," *Jurimetrics Journal*, 1970:121-137) called this mental process "exhaustive Shepardizing," and noted that, since cases are cited for numerous legal propositions, many of which may not be relevant to the current problem, this mental process is really a "selective process."

There are tools and services that aim to assist attorneys in this kind of research. Citator services (e.g., LexisNexis's Shepard's®, and WestLaw's KeyCite®) allow the user to see the whole list of citations that directly reference to a given case. The legal information retrieval (IR) and artificial intelligence (AI) fields have also been offering help, as discussed by K. Ashley et al., "An Introduction to Artificial Intelligence and Law," *Tutorial Handout of Introduction to AI and Law at ICAIL* (2005). Search-based tools can identify cases that are conceptually close to what the user needs by searching with key words the user enters, or by matching important terms between two cases. AI-based techniques, such as machine learning, are also used for relevant prior case retrieval, as described by Al-Kofahi et al., *A Machine Learning Approach to Prior Case Retrieval*, ICAIL-2000). All these tools and services help the researchers tremendously in each of the steps described above. More recently, use of legal taxonomy, ontology, or semantic networks has been brought to the legal IR field (see Hooge et al., "Semantics in the Legal Domain," from Web at: www.arches.uga.edu/~jhassell/project/legal-_paper.pdf (2004); Ashley et al.; Schild et al., "A Taxonomy for Modeling Discretionary Decision Making in the Legal Domain," *Proceedings of the Tenth International Conference on Artificial Intelligence and Law* (2005); Winkels et al., "Constructing a Semantic Network for Legal Content," *Proceedings of the Tenth International Conference on Artificial Intelligence and Law* (2005); Lame et al., "Updating Ontologies in the Legal Domain," *Proceedings of the Tenth International Conference on Artificial Intelligence and Law* (2005); Bourcier et al., "Methodological Perspectives for Legal Ontologies Building: an Interdisciplinary Experience," *Proceedings of the Tenth International Conference on Artificial Intelligence and Law* (2005); Walter et al., "Computational Linguistic Support for Legal Ontology Construction," *Proceedings of the Tenth International Conference on Artificial Intelligence and Law* (2005). However, to do a decent job, the attorney, at each step of his research, has to sift through many case documents before he can move to the next search stage. This exhaustive and selective search process required by traditional methods is very time-consuming, and the results depend, to a large extent, on the issue in question and the accuracy of the search tools used.

When an opinion for a case is written, the author often cites previous cases in support of his or her own reasoning; these cases, in turn, have cited others cases for the same purpose. Over time, these citing-cited relations between cases form a network, referred to herein as "the general citation network." The citation relations in the network are complicated; but they are non-arbitrary as "citational links exist because at some point in time a judge and a lawyer decided that a logical connection existed between certain cases" (Marx). It follows that knowledge embedded in a citation network can be a valuable source for attorneys and legal scholars.

Legal professionals and computer scientists have been interested in this phenomenon. Smith, ("The Web of Law,"

*San Diego Legal Studies Research Paper* No. 06-11, http://ssrn.com/abstract=642863 (2005)), after a thorough study of the American case citations, concluded that the law system "suggests a high degree of intellectual coherence", and that "studying the legal network can shed light on how the legal system evolves and many other questions." BankXX, a system proposed by Rissland et al. (Rissland et al., "BankXX: Supporting Legal Arguments through Heuristic Retrieval," *Artificial Intelligence and Law,* 1996(4): 1-71)) to support legal argumentation, uses citation links between cases in its knowledge base. Hooge et al. describe the LLT Program, which creates a "Legal Logic Tree" for a given case based on citation relations between cases.

However, the researcher lacks a means to see clearly the relationships between all the discussions linked by citations, and a means to quickly view other issues discussed in parallel to the starting issue, because the existing, general citation network is multi-dimensional. This multi-dimensionality exists because a case can cite each of several cases for a different reason; and, likewise, a case can be cited by other cases for different reasons, represented by different line patterns in FIG. 4A. Two citations pointing to the same case may not necessarily be semantically related because they may each be based on a different legal issue. This multi-dimensionality poses a problem to legal researchers who want to focus on individual legal issues because they have to read all retrieved cases to select ones that are on issues of interest. This multi-dimensionality has also made use of existing legal citation networks impractical, as a general network traversing function would retrieve indiscriminately many cases and soon fill the screen space where the retrieved network would be displayed, making viewing and reading impossible.

It is to the solution of these and other problems that the present invention is directed.

SUMMARY OF THE INVENTION

It is accordingly a primary object of the present invention to provide a tool to attorneys and legal researchers in their daily work that saves time, and allows them to easily investigate how individual legal issues were discussed, evolved, and inter-related with each other.

It is another object of the present invention to provide a visualization-based legal research tool that fully utilizes complex citation relations among cases.

These and other objects of the invention are achieved by a visualization-based interactive legal research tool that generates from the general legal citation network a semantics-constrained legal citation sub-network that focuses on an individual legal issue in which a researcher is interested, and puts the sub-network on an interactive user interface ("UI"), which allows the researcher to browse, navigate, and jump to new issues to start new sub-networks that are relevant to original issues.

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1A:
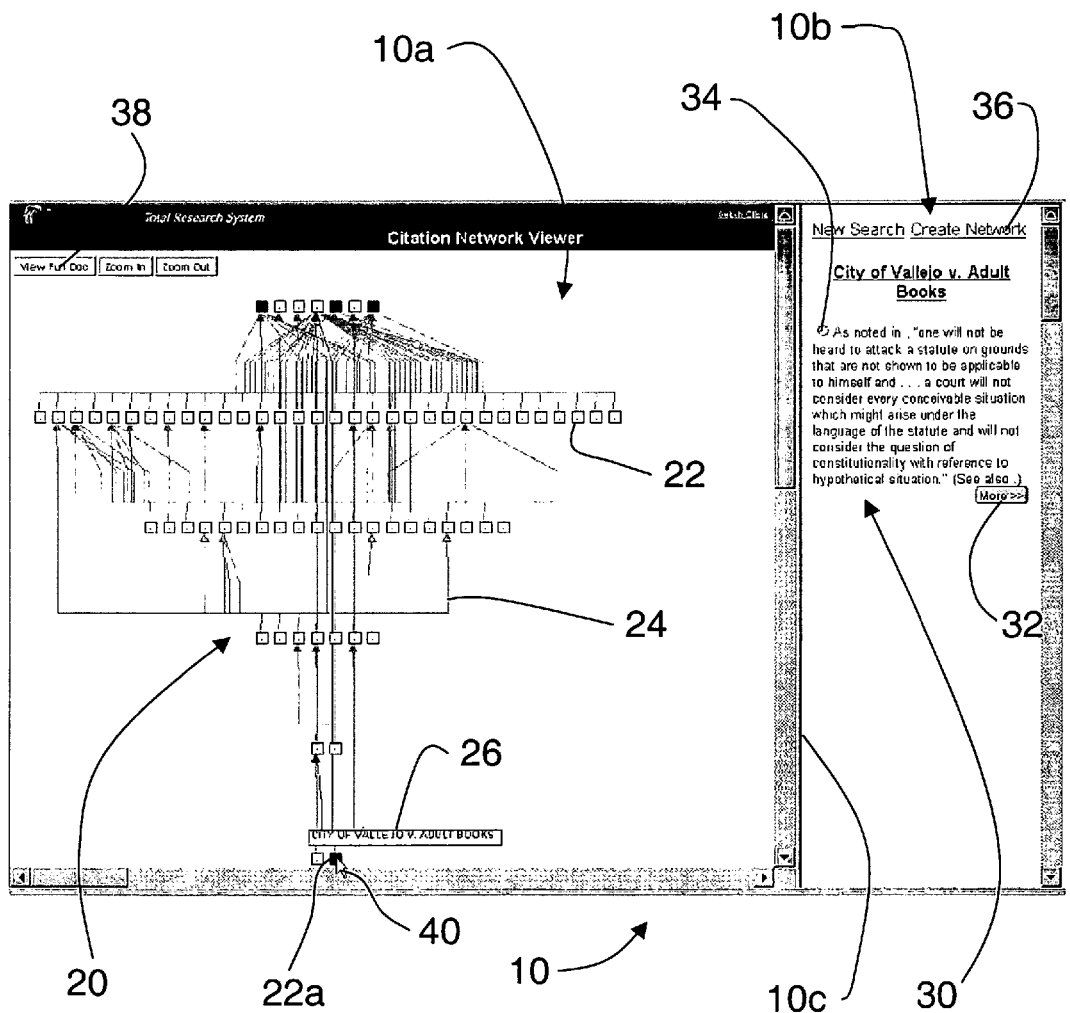
FIGS. 1A-1D illustrate a visualization-based interactive user interface of the network citation viewer in accordance with the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The present invention is described below with reference to flowchart illustrations of methods, apparatus (systems), and computer program products according to an embodiment of the invention. It will be understood that each block of the flowchart illustrations, and combinations of blocks in the flowchart illustrations, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The following definitions are used herein:

"Breadth-first search"—a tree search algorithm used for traversing or searching a tree, tree structure, or graph. Intuitively, the search starts at the root node and explores all the neighboring nodes. Then for each of those nearest nodes, their unexplored neighbor nodes are explored, and so on until the search finds the goal. Formally, breadth-first search is an uninformed search method that aims to expand and examine all nodes of a tree systematically in search of a solution. In other words, it exhaustively searches the entire tree without considering the goal until it finds it. It does not use a heuristic approach. From the standpoint of the algorithm, all child nodes obtained by expanding a node are added to a first-in, first-out ("FIFO") queue.

"Depth-first search"—an algorithm for traversing or searching a tree, tree structure, or graph. The search starts at the root and explores as far as possible along each branch before backtracking. Formally, depth-first search is an uninformed search that progresses by expanding the first child node of the search tree that appears and thus going deeper and deeper until a goal state is found, or until it hits a node that has no children; then the search backtracks and starts off on the next node. In a non-recursive implementation, all freshly expanded nodes are added to a last in-first out ("LIFO") queue (stack) for expansion.

"Headnote"—as used herein, a headnote is text that summarizes a major point of law found in an opinion, expressed in the actual language of the case document. In the case document, a headnote may or may not overlap with an RFC. In the citation network viewer in accordance with the present invention, headnotes and RFCs are treated as the same entities except that, when a headnote does not overlap with an RFC, it cannot be used for backward chaining (i.e., retrieving cases cited by the current case).

"Reason-for-Citing" ("RFC")—in a legal document, an RFC is the text excerpt near a case citation, which suggests the reason for the citation. The RFCs within each case are used as content candidates.

"Reason-for-Citing algorithm" ("RFC algorithm")—a computer-automated algorithm for identifying text in a first "citing" court case, near a "citing instance" (in which a second "cited" court case is cited), which indicates the reason(s) for citing (RFC). The RFC algorithm helps the legal citation viewer in accordance with the present invention correctly locate RFC text areas as well as their boundaries in the document. The RFC algorithm is described in U.S. Pat. No. 6,856,988, which is incorporated herein by reference in its entirety, includes the steps of: obtaining contexts of the citing instances in the respective citing documents (each context including text that includes the citing instance and text that is near the citing instance), analyzing the content of the contexts, and selecting (from the citing instances' context) text that constitutes the RFC, based on the analyzed content of the contexts.

"Text area"—as used herein, a generic term referring to where in a document discussion occurs on a legal issue of interest. The text area can be an RFC (in most cases), a headnote, or an RFC and a headnote in combination; but it may also be neither an RFC nor a headnote.

"Vector"—as used herein, an array of words or phrases that are deemed as important to the document in which it is included coupled with weights indicating its relative importance to the topic of the document. The vector may contain words and phrases (as described, for example, U.S. Pat. Nos. 5,819,260 and 5,926,811, which are incorporated herein by reference in their entireties).

Figure 2:
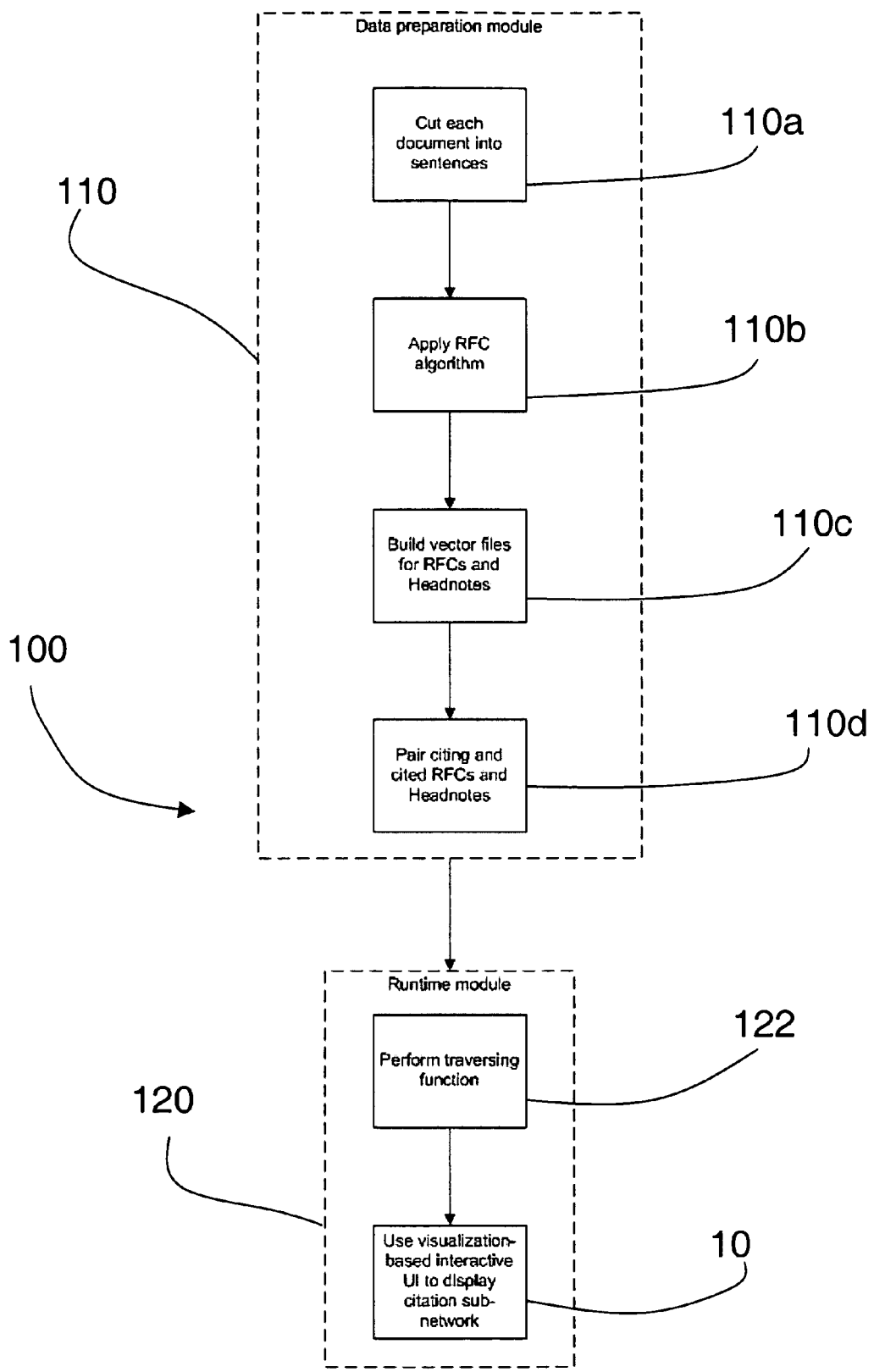
FIG. 2 is a flow diagram illustrating the citation network viewer in accordance with the present invention.

With reference to FIG. 2, the citation network viewer 100 in accordance with the present invention is a visualization-based, interactive research tool, which is particularly useful in, but not limited to, the legal research environment. The citation network viewer 100 in accordance with the present invention is described herein in the context of the legal research environment, but it will be appreciated by those of skill in the art that the principles of the invention could be applied equally well to other research environments, for example, conducting research in scientific literature.

In summary, the citation network viewer 100 generates a semantics-constrained citation sub-network 20 (FIG. 1A) that focuses on an individual issue in which the researcher is interested, and puts the sub-network 20 on an interactive user interface 10, which allows the researcher to browse, navigate, and jump to new issues to start new sub-networks that are relevant to original issues. The network citation viewer 100 enables inclusion into the sub-network 20 of cases that discuss the same legal issue, even if they are not in direct citation paths and the language used in their discussions of the legal issue is not linguistically close.

Figure 4A:
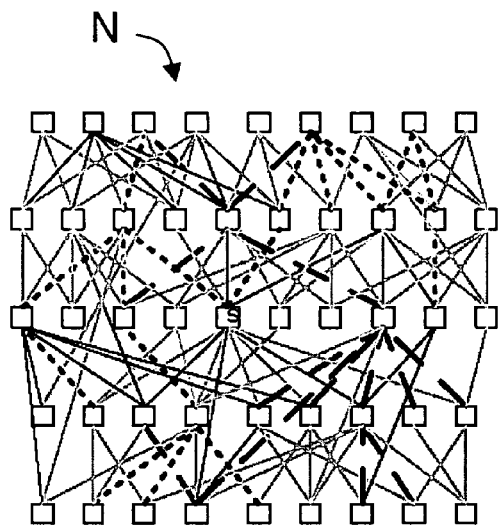
FIG. 4A is a diagrammatic representation of an existing, general citation network.
Figure 4B:
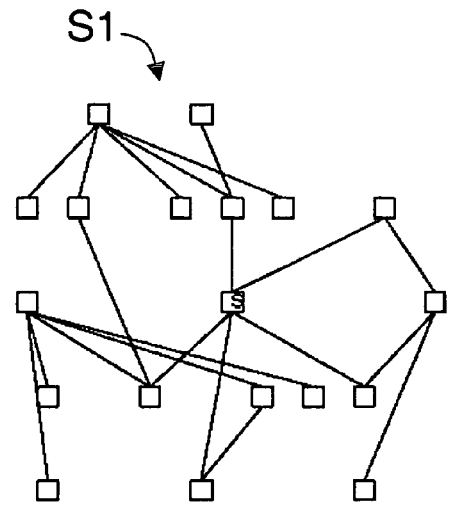
FIGS. 4B-4D are diagrammatic representations of sub-networks separated out from the general citation network of FIG. 4A.
Figure 4C:
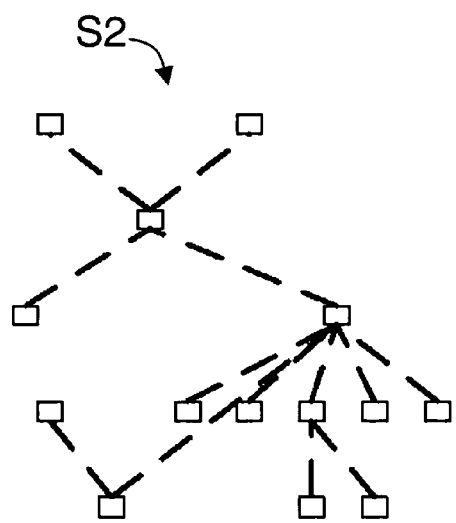
Figure 4D:
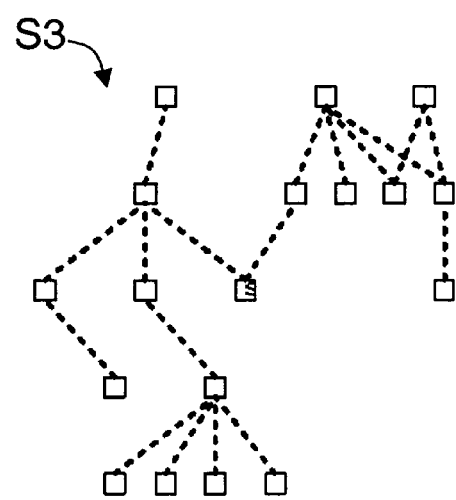
Figure 5:
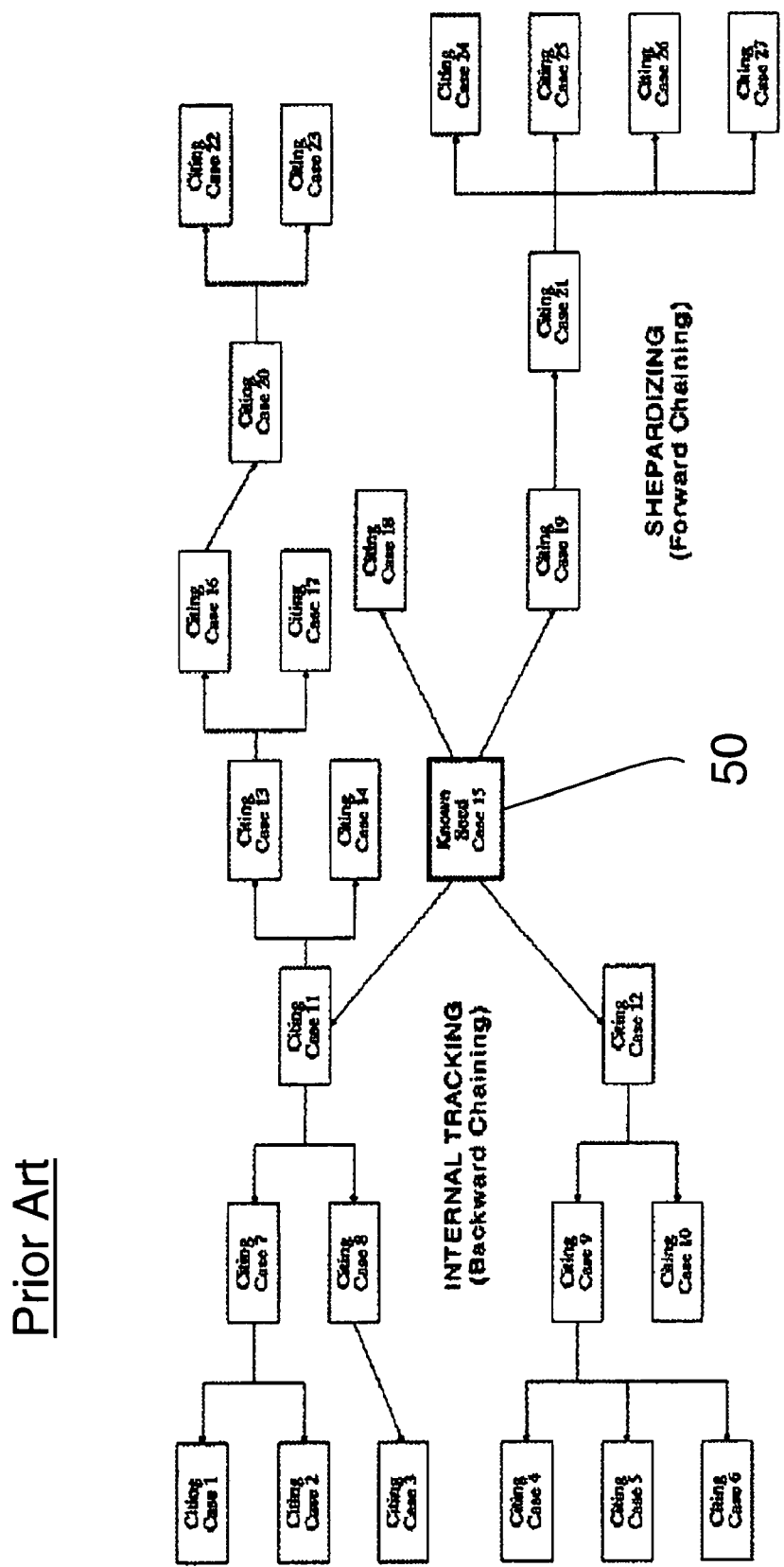
FIG. 5 is a diagram depicting the legal research process as a general attorney behavior model.

Conceptually, the legal citation network N (shown in FIG. 4A) can be dissected into semantics-based sub-networks (shown as S1, S2, and S3 in FIGS. 4B-4D), in which "S" in FIGS. 4A, 4B, and 4D represents the starting case. Each of the sub-networks S1, S2, and S3 focuses on one specific issue; that is, each sub-network S1, S2, and S3 is homogenous (or uni-dimensional). In particular, each node (shown as a box) in each of the sub-networks S1, S2, and S3 represents the discussion of one legal point in a particular case, instead of the whole case, and all the nodes in each sub-network all represent discussions of the same legal issue. The sub-networks S1, S2, and S3 represent how their respective nodes are interrelated by citations. The legal citation network 100 in accordance with the present invention builds one sub-network that represents the discussion of the one legal point specified by the researcher.

Figure 1B:
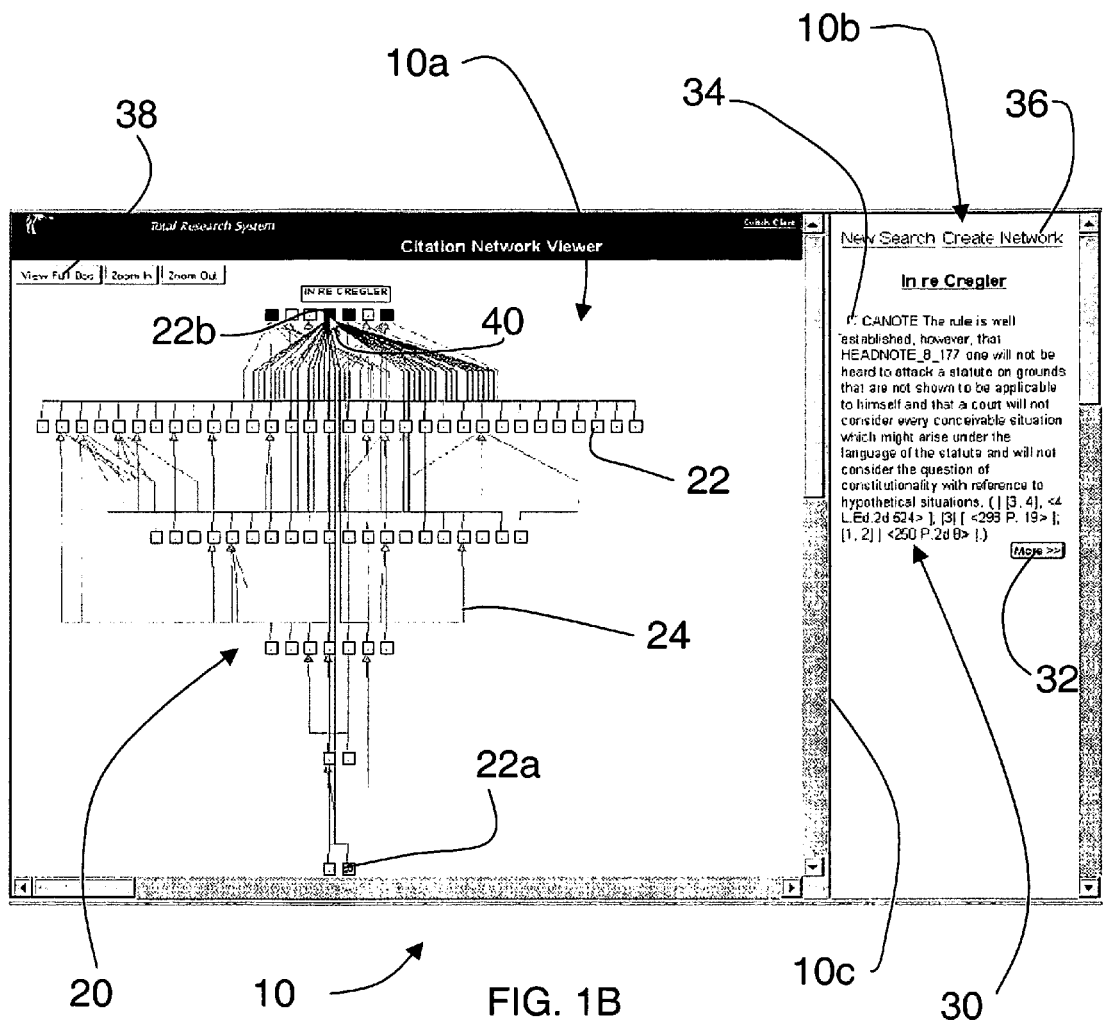
Figure 1C:
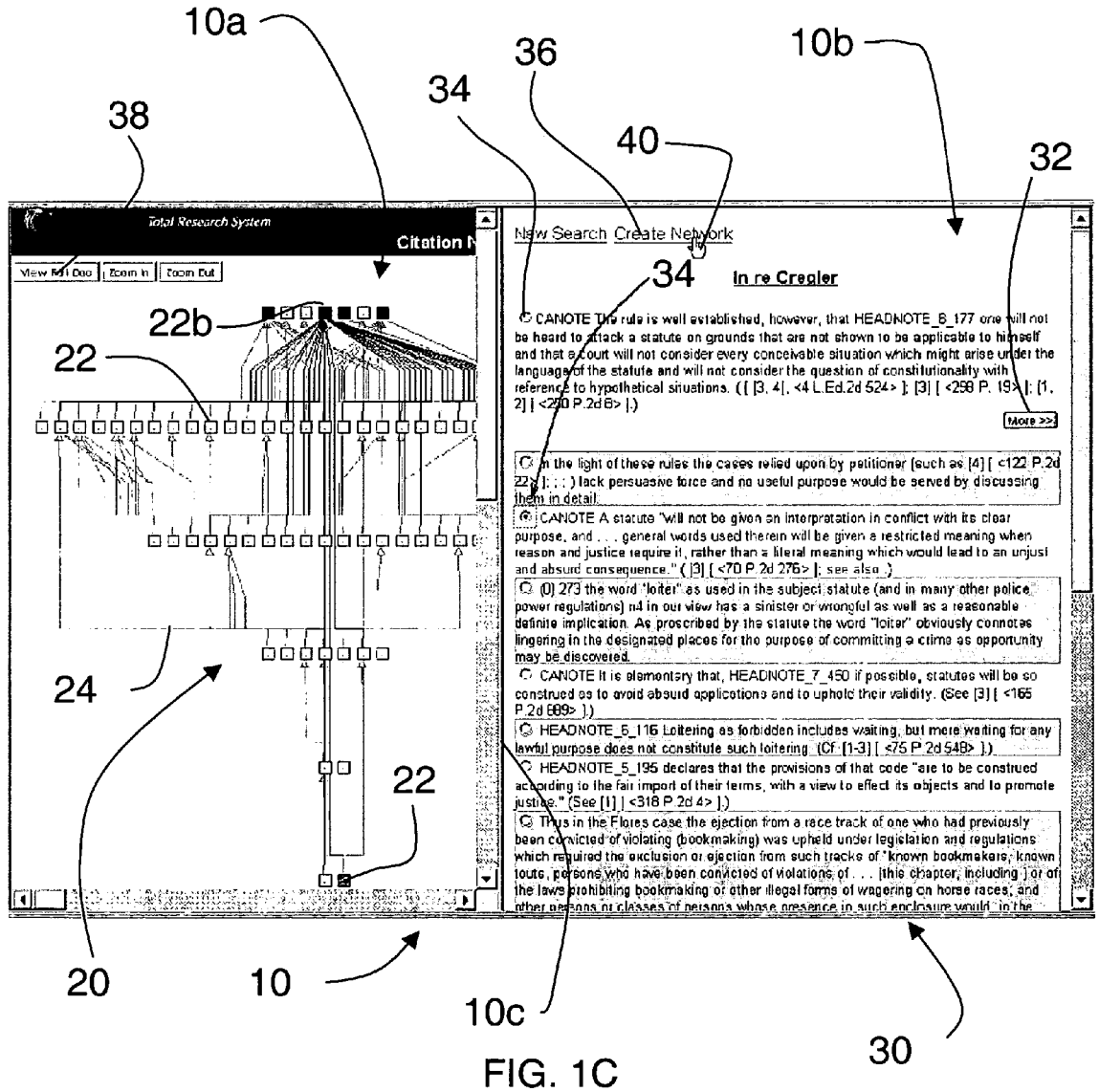
Figure 1D:
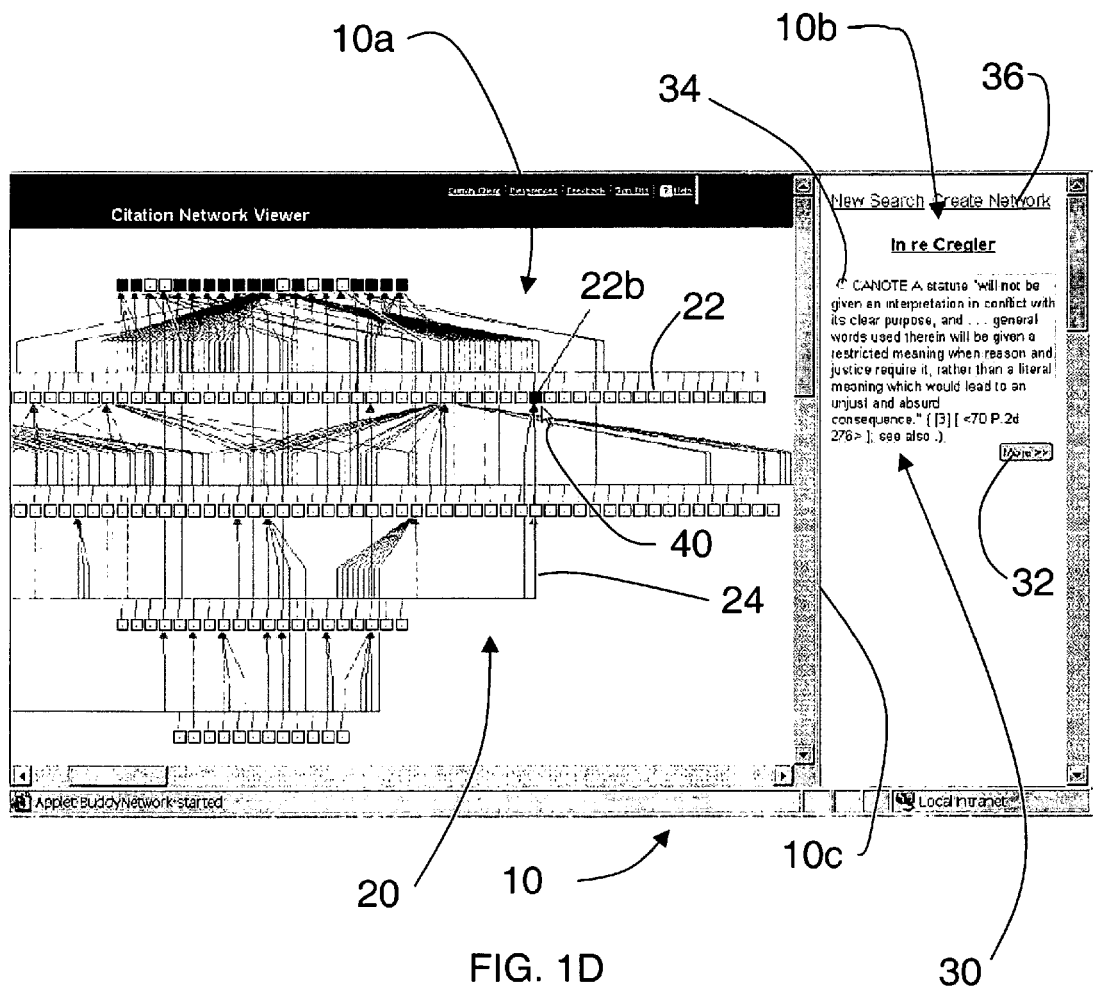

Starting from a user-specified legal issue, the citation network viewer 100 locates from different cases in the legal corpus text areas that discuss the same issue and retrieves the text strings corresponding to the text areas (such text strings being referred to herein as "text excerpts"). The retrieved text excerpts then form a sub-network 20 based on their citation links. The sub-network 20 is then displayed in a network window 10a of a user interface 10, shown in FIG. 1A, where the researcher can easily browse and navigate, and explore how his issue was discussed and evolved in the past, as shown in FIGS. 1B-1D. A digest window 10b on the UI 10 also allows the researcher to see other legal issues 30 discussed in each case and "jump" to one of them to start a new citation sub-network, as discussed in greater detail hereinafter. The relative widths of the network window 10a and the digest window 10b can be changed by dragging the border 10c separating them to the left or the right.

Referring now to FIG. 2, the citation network viewer 100 comprises two major parts, a data preparation module 110 and a run-time module 120. In summary, the process carried out by the data preparation module 110 comprises the following steps:

110a: Cutting each document into sentences.

110b: Applying the RFC algorithm to create new files containing RFCs and the citations associated with each RFC.

110c: Building vector metadata files for RFCs and headnotes in each case. Each line in the vector file contains information of one RFC or headnote represented by important words and phrases coupled with weights assigned to each of them. The selection of important words or phrases is dictionary-driven. Calculation of weights for words and phrases is based on a commonly accepted tf-idf weighting with minor modifications relating to smoothing in accordance with conventional practice as will be understood by those of ordinary skill in the art.

110d: Pairing citing RFCs with cited RFCs and/or headnotes based on similarity between legal concepts discussed in each of them.

More specifically, the data preparation module 110 takes the corpus of all case documents as input, and creates a series of metadata files for use by the run-time module 120.

Each case document in the corpus is first processed by cutting it into sentences, and then by applying the RFC algorithm to extract all citations, RFCs, and headnotes. The RFCs and headnotes are then converted into vectors (through steps such as key term extraction, lexical normalization, weighing, etc.). In the first metadata file, each citation or headnote is linked to the vector produced from the RFC associated with that citation or the headnote.

A second metadata file contains citation pairing information, i.e. Case A cites Case B, where cases are represented by a fixed number of characters for quick access during run time.

The third metadata file contains semantic pairing between an RFC in the citing case and an RFC or headnote in the cited case. Generally speaking, when two cases are linked by citation, locating the RFC text area in the citing case is straightforward, but the text area in the cited case that the citation is for is usually implicit, in the sense that the text area in the cited case exists although it is not necessarily readily apparent. When Case A cites Case B, the author of Case A puts the citation in the case document where the discussion is, so the reason for citing is "explicit" in the citing case (Case A); but the author does not indicate to where in Case B he is referring, making the reason for this citation implicit in the cited case (Case B). An important aspect of the citation network viewer in accordance with the present invention is the way it is designed to identify the text area in a cited case for which a given citation occurred.

If a case is cited for a legal issue, there is usually a text area in the document that discusses this issue; and in most cases, this text area is around another citation (an RFC) referencing to yet another case. It is this kind of linking that makes it possible for the citation network viewer 100 to "relay" and "chain" semantically related citations together. In order to identify the RFC in the cited case that is related to the issue the current citation is for, the content candidates (that is, the RFCs and headnotes) in the cited case are compared with the current RFC in the citing case. A simple vector comparison function as shown in Equation 1 (which is well-known and commonly used in the information retrieval and artificial intelligence fields) is used to measure Sim(x, y), the similarity of two vectors x and y:

$$Sim(x, y) = \sum_{\substack{T \in X \\ T \in Y}} Wt(x, T) \times Wt(y, T) \quad \text{(Equation 1)}$$

where T is a term occurring in both vectors x and y, and Wt(x, T) and Wt(y, T) are weights of the term in the vectors calculated using commonly accepted tf-idf weighting as previously mentioned. The relevant text (RFC or headnote that is the closest semantically to the starting RFC) in the cited case is defined by Equation 2 (which was developed by the inventors in conjunction with the present invention) as the one with the highest similarity to the citing RFC:

$$RText \Rightarrow \underset{i=1}{\overset{K}{\text{Max}}}(Sim(V_i, SV)) \quad \text{(Equation 2)}$$

where K is the number of all RFCs and headnotes in the cited case; V is the vector for the $i^{th}$ RFC or headnote; and SV is the vector of the starting RFC (in the citing case). This relevant text (RFC or headnote) is considered the reason for which the current case was cited. The citing RFC and this relevant RFC or headnote are paired and written to an RFC pairing table (together with the similarity measure). In this RFC pairing table, citing RFCs and cited RFCs or headnotes are semantically linked. They are used to support the network traversing function 120a.

There are other supporting files, mainly files containing texts to be displayed in the UI and various hash files to facilitate quick access to data.

The run-time module 120 includes two major components for run-time operations, a semantics-driven network traversing function 120a and the visualization-based interactive user interface 10 described above. When the researcher chooses a citation from a case and starts the citation network viewer 100, the traversing function 120a creates a sub-network 20 from the citation with its RFC as the focused legal issue (FIG. 1A). The sub-network 20 is displayed in the UI's network window 10a.

The traversing function 120a does a depth-first search in the citation network (represented by semantic links between cases, as described above) based on a user-specified legal issue represented by an RFC or headnote. At each node, the data file is accessed, which returns a list of new RFC or headnote candidates. Each of these new RFC or headnote candidates is then used to search for more candidates in the same manner. The depth-first search is set to allow for retrieval of networked citations (that is, RFCs and headnotes) that are related to the user-specified legal issue (that is, that are highly relevant to the starting RFC or headnote along the citation chains (both directly and indirectly)). Although the traversing function 120a as described on its face may appear to employ a breadth-first search, the breadth-first aspects of the search are present only for the purpose of speeding up the data access. Globally speaking, the traversing function 120a employs a depth-first search.

Starting from a given citation, the traversing function 120a searches the RFC pairing table. It retrieves all citations referred to by the current citation (backward chaining), as well as citations that cited the current citation (forward chaining). These retrieved citations are then used for further searches in the same manner. This recursive search operation goes on until exit conditions are met (e.g., the $N^{th}$ level from the starting citation is reached, where N is a predetermined number; or citations outside the jurisdiction are retrieved). When a case does not have a direct citing link to the starting case, the traversing function 120a uses a threshold in the search so that the retrieved RFCs and/or headnotes are close enough to the starting citation. The threshold used is based on empirical testing. The retrieved citations are used to form a network. Because they are all semantically "chained" to the starting RFC, the network is semantically homogeneous.

The citations retrieved and the pairing information between them are sent to a Java program, which initiates the user interface 10 of the citation network viewer 100. As shown in FIG. 1A, the visualization-based interactive user interface 10 displays the retrieved RFCs and/or headnotes in the form of a sub-network 20, the contents of which the researcher can browse, navigate, and explore, as discussed in greater detail hereinafter. The exemplary UI 10 shown in FIGS. 1A-1D has two windows, a network window 10a on the left, in which the sub-network 20 is displayed, and a digest window 10b on the right. The sub-network 20 comprises a plurality of small icons, in this example boxes 22, linked by lines 24. Each small box 22 represents the discussion of the user-specified legal issue in a particular case, in the form of a retrieved RFC or headnote. The lines 24 indicate the citing relations between the cases corresponding to the text represented by the boxes 22. When two boxes 22 are linked, in the sub-network 20 as illustrated in FIGS. 1A-1D, the box in the lower position citing the one in the higher position.

A box 22 that the user has selected by clicking is referred to herein as the "focused box." Different colors are used in the sub-network 20 to help the user to easily see the links into and out from a box, as discussed in greater detail hereinafter. The text 30 of the RFC or headnote (the discussion of the issue) corresponding to the "focused" box is displayed in the digest window 10b on the right. When the user clicks on the More button 32, the digest window 10b on the right side of the UI 10 expands to include all RFCs and headnotes 30 for the focused case, that is, the case on which the user has selected to focus, which can be the start case or another case selected by the user from the sub-network 20. In the sub-network 20 as illustrated in FIG. 1A, the case on which the user has selected to focus, *City of Vallejo v. Adult Books*, is also the start case, so the RFC shown in the digest window 10b is the "start RFC," that is, the RFC for the start case. Because the digest window 10b lists all RFCs and headnotes 30 for the focused case, regardless of their relation to the current, user-specified legal issue, the listing is in essence a "digest" of the focused case, which allows the user to see how other researchers selected and used legal points in their arguments. If the researcher finds one of these RFCs or headnotes 30 to be interesting, he can "jump" to it to start a new sub-network view. At any time, the researcher can select a link (illustrated as a "View Full Doc" button 38 in FIGS. 1A-1C) to go to the full document of a selected case.

The user can use the cursor 40 in the UI's network window 10a to browse the content of the sub-network 20 quickly. When the cursor 40 is moved over one of the small boxes 22, which in FIG. 1A is denoted as 22a and is actually the start case), information about the case it represents (e.g. the case name and time) is displayed in a pop-up window 26, the outline of the box 22a changes to a first color (for example, blue), and all citation links 24 leading into or out from the box 22 to which the cursor 40 is pointing change to the same color as the outline of the box 22a. This allows the user to see the citation relations between the case corresponding to the box 22a to which the cursor 40 is pointing and other cases corresponding to the other boxes 22, with regard to the user-selected legal issue. The user can also click on one of the small boxes 22 to make it "focused," which will bring the RFC or headnote text 30 of that box into the digest window 10b for viewing. When the user clicks on a box 22 to make it "focused," the focused box changes to a second color (for example, red), as do all citation links 24 leading into or out from it. All boxes 22 that have direct citation relations with the focused box 22a are highlighted with a color different from the second color. A box 22 will remain a focused box 22a until the user clicks to focus on a different box.

The user can also use the citation network viewer 100 to study how other attorneys have previously used or argued for the current issue in conjunction with other legal issues, by expanding the digest window 10b to include all important points discussed in the focused case (by pressing the MORE button 32 in the digest window 10b). If the user finds a different issue in the digest window 10b that is related to his research question, he can click on a radio button 34 associated with that issue and the "Create Network" button 36 to "jump" to start a new network (see FIG. 1C). This feature allows the user to study how different legal issues are related and how they were used together to build legal arguments in the past. At any time, the user can click on the "View Full Doc" button 38 to read the full text of a case.

In the scenario illustrated in FIGS. 1A-1D, the user, after viewing the sub-network 20, finds one case (in this example,

*In re Cregler*, 56 Cal. 2d 308 (1961), being the most popular one (and possibly, a landmark case) interesting, and clicks on the corresponding box 22b to "focus" on it (FIG. 1B). As shown in FIG. 1B, focusing on the box and its associated case will highlight links connected to it and brings the RFC of the new citation to the digest window 10a.

The user can read the RFC or headnote of the focused box 22 in the digest window 10b and compare it with RFCs or headnotes of other cases. He can also expand the digest window 10b by pressing the MORE button 32 to start the digest function. Starting the digest function brings all important legal issues of the focused case to the digest window 10a as a digest view of the case. The user can easily browse this digest view by scrolling up and down the list and reading different legal issues discussed in the case. If the user finds another legal point interesting, he can select the issue (for example, by clicking on a radio button 34 associated with the issue), and press the "Create Network" button 36 to "jump" to the new and different legal issue (FIG. 1C). The citation network viewer 100 will then create a new network view with this new citation and legal issue (FIG. 1D). With the design of the UI 10, the user can easily navigate among citations and across different legal issues. At any time, the user can click a link (which as illustrated in FIGS. 1A-1C is the "View Full Doc" button 38 at the upper left of the network window 10a) to bring up a full document view of the focused case.

Figure 3:
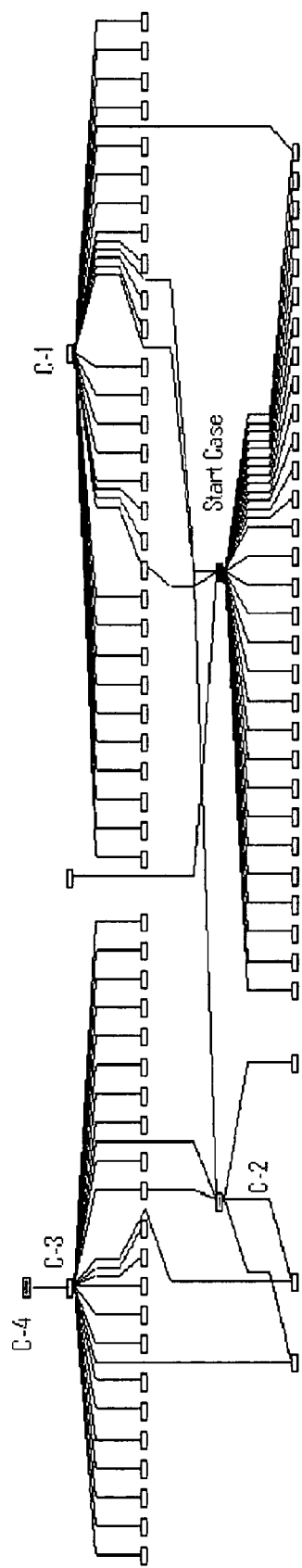
FIG. 3 is a diagrammatic representation of a network that links legal discussions that are not in direct citation path and are not linguistically close.

FIG. 3 is a printout from a graphics tool based on the sub-network 20 generated by the traversing function 120a, as illustrated in FIG. 1A. It illustrates the sub-network 20 links two legal discussions that are not linguistically close in two cases, C-1 (*Pacific Legal Foundation v. Brown*, 29 Cal. 3rd 168 (1981)) and C-4 (*People v. Perry*, 212 Cal. 186 (1931)), that are not in a direct citation path. For illustrative purposes, some nodes and links are removed so that the graphics are easier to read. In the exemplary sub-network 20 of FIG. 3, traversal of the sub-network 20 begins with the start case, *Tobe v. City of Santa Ana*, 9 Cal. 4th 1069 (1995). In FIG. 3, the start case cites case C-1 among other cases; case C-1 is cited by case C-2 (*Willadsen v. Justice Court*, 139 Cal. App. 3rd 171 (1983)), which also cites case C-3 (*In re Cregler*). Case C-3 cites case C-4. From the start case, the citation network viewer 100 successfully traces to case C-4, which is remote from the start case in the network space (i.e., not on a direct citation path to the start case). In terms of time, the two cases are sixty-four years apart. Even though the RFCs of the two cases are discussion of the same legal issue, they are not linguistically close, which can be seen from the text in their respective RFCs, which are as follows:

Start case (*Tobe v. City of Santa Ana*): "A facial challenge to the constitutional validity of a statute or ordinance considers only the text of the measure itself, not its application to the particular circumstances of an individual. To support a determination of facial unconstitutionality, voiding the statute as a whole, petitioners cannot prevail by suggesting that in some future hypothetical situation constitutional problems may possibly arise as to the particular application of the statute, or as to particular terms of employment to which employees and employer may possibly agree. Rather, petitioners must demonstrate that the act's provisions inevitably pose a present total and fatal conflict with applicable constitutional prohibitions."

C-4 (*People v. Perry*, 212 Cal. 186): "... the courts will not give their consideration to questions as to the constitutionality of a statute unless such consideration is necessary to the determination of a real and vital controversy between the litigants in the particular case before it. It is incumbent upon a party to an action or proceeding who assails a law invoked in the course thereof to show that the provisions of the statute thus assailed are applicable to him and that he is injuriously affected thereby."

It is not possible to make this kind of connection using traditional search methods without a large amount of manual work on the part of the researchers.

The traversing function 120a automatically traverses the citation network and locates texts of discussion for the issue the researcher provides, which is fast and efficient. This also helps the researcher find cases that did not directly cite each other, and cases that discuss the same issue in varied forms of language. Since the search is guided by both semantics and citation links, the returned texts have a high accuracy of relevancy (over 90% according to a formal evaluation by three attorneys).

The visualization-based interactive user interface 10, an example of which is shown in FIG. 1, enables the researcher to better perceive relations among cases and legal issues, and how discussion of these issues have evolved over time. With the help of the network citation viewer, the researcher can focus on issues instead of whole cases during his/her research. The visual image of the network also allows the researcher to locate landmark cases, or cases that were frequently cited for specific issues.

The citation network viewer 100 in accordance with the present invention benefits researchers in a number of ways. It easily and accurately traces a given legal issue in past and subsequent cases. It also gives the researcher a visual image of how citations are interrelated, and the ability to navigate in the network. The "digest window" of each case lists important legal discussions, allowing researchers to focus on issues rather than whole cases and, in this way, save time; and also allowing researchers to "jump" to different points to start a new network on related issues.

The citation network viewer 100 can help the researcher visually identify landmark cases. Being data-driven, the citation network viewer 100 does not rely on and is not limited by existing classification systems It is to be understood that the present invention is not limited to the illustrated user interfaces or to the order of the user interfaces described herein. Various types and styles of user interfaces may be used in accordance with the present invention without limitation.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A computer-implemented citation network viewer comprising:
    data preparation means for taking a corpus of documents as input, and creating a series of metadata files, wherein each document has a citation and discusses at least one issue, and wherein relations between the documents as defined by their citations form a multi-dimensional citation network, the data preparation means including:
        means for cutting each document into sentences;
        means for identifying in each cut document, all citations, and all reasons-for-citing and headnotes associated with the identified citations, using a reason-for-citing algorithm;
        means for converting the identified reasons-for-citing and the identified headnotes in each document into vectors; and
        means for establishing semantic links between documents by pairing staffing reasons-for-citing in citing documents with cited reasons-for-citing and headnotes in cited documents by defining the text in each cited document that is closest semantically to the staffing reason-for-citing in the citing document, as defined by the equation:

$$RText \Rightarrow \max_{i=1}^{K}(Sim(V_i, SV)),$$

where K is the number of all reasons-for-citing and headnotes in each cited document, V is the vector for the $i^{th}$ reason-for-citing or headnote, and SV is the vector of the staffing reason-for-citing in the citing document; and
    run-time means for carrying out run time operations, using the metadata files created by the data preparation means.

2. A computer-implemented citation network viewer comprising:
    data preparation means for creating a series of metadata files from a corpus of input documents, each document having a citation and discussing at least one issue, wherein the citations of the documents form a multi-dimensional network of citations, and wherein the at least one issue is represented by one of a headnote and a reason for citing;
    semantics-driven network traversing function means for creating from the metadata files of the documents forming the multi-dimensional network, a sub-network of citations of documents that focuses on a specific issue selected by a researcher; and
    visualization-based interactive user interface means for displaying interactive graphics representing the sub-network;
    wherein the data preparation means includes:
        means for cutting each document into sentences;
        means for identifying in each cut document, all citations, and all reasons-for-citing and headnotes associated with the identified citations, using a reason-for-citing algorithm;
        means for converting the identified reasons-for-citing and the identified headnotes in each document into vectors; and
        means for establishing semantic links between documents by pairing starting reasons-for-citing in citing documents with cited reasons-for-citing and headnotes in cited documents by defining the text in each cited document that is closest semantically to the starting reason-for-citing in the citing document, as defined by the equation:

$$RText \Rightarrow \max_{i=1}^{K}(Sim(V_i, SV)),$$

where K is the number of all reasons-for-citing and headnotes in each cited document, V is the vector for the $i^{th}$ reason-for-citing or headnote, and SV is the vector of the staffing reason-for-citing in the citing document.

3. The citation network viewer of claim 2, wherein the sub-network comprises a plurality of nodes, each node representing one of a reason for citing or a headnote in a single document discussing the specific issue.

4. The citation network viewer of claim 2, further comprising means for linking each citation to a vector produced from the reasons-for-citing or headnote associated with that citation.

5. The citation network viewer of claim 2, further comprising means for building vector metadata files for reasons-for-citing and headnotes in each document, wherein each line in the vector metadata files contains information of one reason-for-citing or headnote represented by terms found in term lists and weights assigned to them.

6. The citation network viewer of claim 2, wherein the run-time means includes
    traversing function means for performing a depth-first search in the citation network represented by the semantic links between documents established by the means for establishing semantic links, and for retrieving forward-chained and backward-chained reasons-for-citing and headnotes based on a staffing reason-for-citing representing a user-specified citation, and
    visualization-based interactive user interface means for displaying the retrieved reasons-for-citing and headnotes in the form of a sub-network of the citation network and for allowing the researcher to browse, navigate, and explore the contents of the sub-network.

7. The citation network viewer of claim 6, wherein the depth-first search is set to allow for retrieval of reasons-for-citing and headnotes that are highly relevant to the staffing reason-for-citing along the citation chains, both directly and indirectly.

8. The citation network viewer of claim 6, wherein the visualization-based interactive user interface also displays a digest window that allows the researcher to see other issues discussed in each document and "jump" to one of the other issues to staff a new sub-network.

* * * * *